3,065,232
NOVEL HEXAHYDROTRIAZINES AND SYNTHESIS THEREOF

Donald K. George, Baltimore, Md., assignor to FMC Corporation, a corporation of Delaware
No Drawing. Filed Mar. 24, 1959, Ser. No. 801,457
7 Claims. (Cl. 260—248)

This invention relates to novel esters of tris-(carboxy)-hexahydrotriazines, and to a novel synthesis thereof. These materials are effective oil-resistant and light-stable plasticizers, particularly suitable for use in nitrocellulose and vinyl resins.

Heretofore it has been known to prepare lower alkyl tris(carbalkoxy)-hexahydrotriazines by the reaction of methyl, ethyl or propyl carbamates with aqueous formaldehyde, in the presence of an acid catalyst. For example, the preparation of tris(carbethoxy)-hexahydrotriazine by the reaction of urethane and formaldehyde in hydrochloric acid is described by C. S. Marvel in J. Am. Chem. Soc. 68, 1685 (1946). However, when the carbamate reactant is derived from alcohols higher than propyl, the product of this reaction is not a simple hexahydrotriazine as before, but is a viscous oil or waxy solid, usually having a viscosity in the range of about 10 to 2000 poises. The viscosity of the polymers obtained depends on the duration of the reaction between the carbamate and formaldehyde: the longer the reaction time, the higher the product viscosity. Only from lower alkyl carbamates are crystallizable tris(carbalkoxy)-hexahydrotriazines produced, and even this may not happen if the reaction mixture is subjected to prolonged heating, but viscous polymeric products may be produced instead. No cyclic triazines have been obtained from this reaction when the starting material is a carbamate derived from alcohols higher than propyl, and in fact the propyl compound is obtained only under carefully controlled conditions. Monomeric esters of tris(carboxy)-hexahydrotriazines derived from carbamates higher than propyl have heretofore not been known, since known methods of preparing such compounds resulted in the formation of polymers rather than monomers; these polymeric products are described in U.S. Patent 2,171,965.

It has now been discovered that the high molecular weight polymeric oils, and solids which, as reported in the prior art, are produced by reacting carbamates higher than propyl with formaldehyde, can be transformed into monomeric cyclic hexahydrotriazines, by heating the polymers with an acid catalyst at temperatures above 100° C. in the substantial absence of water. The monomeric hexahydrotriazines are produced in good yields by what is, in effect, a degradation and rearrangement of the linear polymer—a reaction which does not occur to a significant extent except under the anhydrous conditions imposed after the polymer has formed. The cyclic hexahydrotriazines thus produced are low-viscosity, oily liquids, having a utility as plasticizers for nitrocellulose and other resins which is not present for the lower, crystalline homologs.

The overall process of this invention is illustrated by the following general equation:

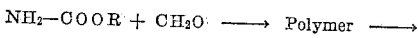

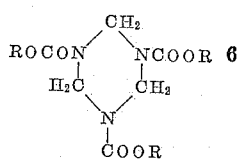

In carrying out the process of this invention, the first step is the formation of the viscous, semi-solid products such as have heretofore been obtained by the reactions of carbamates with formaldehyde. These procedures have been described in U.S. Patent 2,171,965 noted above. Briefly, the process involves the reaction of an ester of carbamic acid with formaldehyde in the presence of an acid catalyst.

The ester of carbamic acid may be derived from any of a wide variety of alcohols having at least three carbon atoms. Thus, in the above formulae, R may be alkyl, including propyl, butyl, isobutyl, sec.-butyl, amyl, hexyl, heptyl, ethylhexyl, octyl, dodecyl and the like, cycloalkyl such as cyclohexyl, cyclopentyl, methylcyclohexyl and the like, aralkyl such as benzyl and phenylethyl, and aromatic such as phenyl, tolyl, xylyl and the like. The R groups may be also substituted, with groups such as halogen, hydroxy, alkoxy and others which are inert under the reaction conditions. Where R is propyl, the corresponding tris (carbalkoxy)-hexahydrotriazine may be prepared in poor yield directly from the reaction of propyl carbamate and formaldehyde; by the instant process, however, substantially improved yields are obtained. And when R contains four or more carbon atoms, the corresponding triazine was heretofore available by no known methods.

The formaldehyde reactant may be provided as aqueous formalin, or in other forms such as paraformaldehyde and trioxane. Usually a slight molar excess of formaldehyde is used.

The catalyst is about 5 to 10%, by weight of the carbamate, of a strong acid. Mineral acids and acid salts are normally used, although the stronger organic acids are also effective. This mixture is refluxed for several hours, at temperatures under 100° C., to form the polymer. The polymer may be washed free of acid, or residual acid may be retained for use in the next step. The polymer is dried for use in the next step. Prolonged heating, or the use of larger amounts of acid, serve to increase the viscosity of the products. For use in the instant invention, the viscosity of the product formed at this stage is not critical. The products obtained are viscous hemi-colloidal oils or waxy solids, primarily linear in structure, having a viscosity in the range of about 10 to 2000 poises. A convenient viscosity product for use in the next step is in the range of about 50 to 100 poises.

In the next step, these linear polymeric products are degraded and rearranged to form monomeric cyclic hexahydrotriazines. This is accomplished by treating the polymeric product with an acid or acid-reacting cataylst in an anhydrous system for several hours at temperatures above 100° C.

The polymeric product may be dried by standard procedures, such as azeotropic distillation or stripping under reduced pressure. In practice, this is conveniently done at the end of the polymerization step, although water may also be distilled out of the system under the temperature conditions of the degradation step. The source of the water in the polymeric product is not only any water present in the reactants, but water of reaction produced during the polymerization.

Suitable acid catalysts for the degradation include mineral acids such as surfuric or phosphoric acid, strong organic acids such as acetic acid, chloroacetic acid, trichloroacetic acid, diglycolic acid, oxalic acid, alkyl and arylsulfonic acids, and the like as well as such acid-reacting catalysts as zinc chloride and aluminum chloride. In general, the stronger the acid, the more rapid and effective the cyclization reaction, and best results are generally obtained using mineral acids. It is preferable to use an acid which is not volatile under the reaction conditions, although acids such as hydrochloric or formic may be used under super-atmospheric pressure. About 1–10% by weight of acid catalyst is generally adequate to effect the reaction, although there is no disadvantage to using larger amounts of acid. At very low acid concentrations or when using very weak acids the viscosity decrease is very slow, and complete reaction may not be obtained in a reasonable time. Residual acid from the first step of the process may be used to provide all or part of the acid necessary for carrying out the second step.

Temperatures over 100° C. are required for the degradation reaction, and best results are generally obtained between about 120° and 150° C. At temperatures below 100° C. the rearrangement reaction is too slow to be practical. The upper temperature's limit is controlled by the stability of the product, which tends to decompose in the presence of acid at elevated temperatures, resulting in color formation which may be difficult to remove. In the preferred temperature range a reasonably rapid reaction with little or no color formation is obtained, any color which may form being readily removed by subsequent carbon treatment.

If it is desired, for a particular use, to produce a product of intermediate viscosity, the degradation reaction may be stopped at the desired intermediate point, or smaller amounts of acid catalyst or weaker acid or lower temperatures may be employed to control the reaction. It is of interest to note that the degradation reaction does not occur during the initial reaction between the carbamate and formaldehyde, but only at the higher temperatures applied after the polymer has been formed.

When the reaction is complete, or when the product viscosity has been brought to the desired value, the mixture is cooled, washed free of acid, and decolorized and distilled or otherwise purified if necessary. Standard procedures may be employed in working up the product.

As previously noted, the viscosity of the polymeric product formed from the initial condensation of the carbamate with formaldehyde is preferably in the range of about 50–100 poises, although the polymerization may be so carried out as to vary from 10 poises for lower alkyl groups to over 2000 poises. The subsequent rearrangement and degradation of the polymer results in a final product having a viscosity of about 1–5 poises for straight chain alkyl groups, and higher in the case of long chain or branched chain alkyl and bulky R groups, usually up to about 10 poises. Where products of higher viscosity are desired for particular uses, mixtures of monomeric triazine and polymer may be prepared by this degradation reaction, to produce useful products having viscosities up to about 50 poises.

The following examples illustrate certain embodiments of the invention, and are not to be construed as limitative thereof:

EXAMPLE I

*Preparation of 1,3,5-Tris(Carbobutoxy)-Hexahydro-s-Triazine*

A mixture of 1754 parts of n-butyl carbamate and 1400 parts of 37% aqueous formaldehyde was acidified with 90 parts of 87% phosphoric acid and refluxed for 1.5 hours. Water was distilled off at 20 mm. pressure. The residue was a colorless material having a viscosity in the range of 60–80 poises at 25° C. Ten grams of decolorizing carbon was added and the residue was heated to 140–150° C. and maintained at this temperature for five hours while stirring. The carbon was then removed by filtration, to yield 1893 parts of a lightly yellow-colored oil having a viscosity of 3.4 poises at 25° C.

This product was purified as follows: A portion of product was washed with hot water, dilute sodium hydroxide, dilute sodium sulfite, and finally with hot water. The washed product was distilled free of water under 20 mm. pressure up to an internal temperature of 130° C. and filtered, to give a practically colorless, odorless oil having a viscosity of 1.8–2.0 poises at 25° C., $n_D^{25}$ 1.4673. Distillation of the finished product under 0.5 mm. pressure produced a forerun boiling up to 217° C., which partly crystallized on cooling. The crystalline material in this fraction was identified as N,N'-methylene-bis(butylcarbamate), M.P. 97–98° C. The main fraction was a colorless, odorless oil boiling at 217–222° C. at 0.5 mm. The viscosity of this material was 1.4 poises at 25° C.; $n_D^{25}$ 1.4672; $d_4^{25}$ 1.087. Infrared absorption spectra and analysis of ionic fragments by the mass spectrometer confirm the hexahydro-s-triazine structure. Molar refraction: Calc'd for 1,3,5-tris(carbobutoxy)-hexahydro-s-triazine: 99.54. Found: 98.41.

*Analysis.*—Calc'd for $C_{18}H_{33}N_3O_6$: C, 55.79; H, 8.59; N, 10.85. Found: C, 56.16; H, 8.57; N, 10.71.

Molecular weight (by mass spectrometer): Calc'd: 387. Found: 387.

When this product was milled with polyvinyl chloride resin, a plasticized product having excellent oil resistance was obtained.

EXAMPLE II

*Preparation of 1,3,5-Tris(Carboisopentoxy)-Hexahydro-s-Triazine*

Isoamyl carbamate, 131 parts, and 93 parts of 37% aqueous formaldehyde were acidified with 5 parts of 87% phosphoric acid in 50 parts of water and refluxed for two hours. The product was distilled free of water at 20 mm. pressure. The viscosity of the residual colorless material was greater than 100 poises at 25° C. On standing for several hours this material set up to a stiff paste. This residue was heated for two hours at 140–150° C. After one hour the viscosity had dropped to 8.8 poises at 25° C. After two hours the viscosity was 7.2 poises. The product was treated with decolorizing carbon and filtered, to yield 85 parts of a light-yellow colored oil, $n_D^{25}$ 1.4544. An 80 part portion of this material was washed by agitation with hot water, dilute caustic, dilute sodium sulfite and finally several times with hot water. The washed oil was freed of water by distillation and filtered, to give 73 parts of a yellowish oil having a viscosity of 6.25 poises at 25° C., $n_D^{25}$ 1.4650. Infrared analysis of this material showed it to consist primarily of 1,3,5-tris(carboisopentoxy)-hexahydro-s-triazine.

*Analysis.*—Calc'd. for $C_{21}H_{39}N_3O_6$: C, 58.71; H, 9.14; N, 9.81. Found: C, 58.14; H, 9.20; N, 9.75.

When this product was milled with polyvinyl chloride, resin, a plasticized product having excellent oil resistance was obtained.

EXAMPLE III

*Preparation of 1,3,5-Tris(Carbopentoxy)-Hexahydro-s-Triazine* n-Amyl carbamate, 131 parts, and 89 parts of 37% aqueous formaldehyde were acidified with 7 parts of 87% phosphoric acid and refluxed for two hours. The product was distilled free of water at 20 mm. pressure. The residue was a colorless viscous balm. This material was then heated for a total of 3.5 hours at 140–150° C. After 15 minutes the viscosity was 17.5 poises at 25° C., after 30 minutes the viscosity had dropped to 2.75 poises at 25° C., after 1 hour the viscosity was 2.50 poises at 25° C., and after two hours the viscosity was 2.25 poises at 25° C. The product was carbon-treated and filtered, to give 10 parts of a yellowish oil. This material was washed and dried as in the previous examples. The washed product was a colorless and odorless oil having a viscosity of 1.65 poises at 25° C. and $n_D^{25}$ 1.4659. Infrared analysis of this product showed it to consist almost entirely of 1,3,5-tris(carbopentoxy)-hexahydro-s-triazine.

*Analysis.*—Calc'd. for $C_{21}H_{39}N_3O_6$: C, 58.71; H, 9.14; N, 9.81. Found: C, 58.6; H, 9.27; N, 9.51.

When this product was milled with nitrocellulose resin, a plasticized product having excellent oil resistance was obtained.

EXAMPLE IV

Preparation of 1,3,5-Tris(Carbooctoxy)-Hexahydro-s-Triazine

A mixture of 173 parts of n-octyl carbamate and 89 parts of 37% formaldehyde was acidified with 7.5 parts of phosphoric acid in 50 parts of water and refluxed for 1.5 hours. After distilling the product free of water under 20 mm. pressure, the residue was found to be a very viscous paste. This material was heated at 140–150° C. for a total of 3.5 hours. After 15 minutes the viscosity of the product had fallen to 4.8 poises at 25° C. After 2.5 hours the viscosity was 3.2 poises at 25° C. At the end of 3.5 hours the product was treated with decolorizing carbon and filtered, to yield 125 parts of a yellowish oil having a viscosity of 2.9 poises at 25° C. This product was then washed and dried as in the previous examples to yield a practically colorless oil having a viscosity of 2.4 poises at 25° C. and $n_D^{25}$ 1.4645. The infrared absorption spectrum of this material showed it to consist principally of 1,3,5-tris(carbooctoxy)-hexahydro-s-triazine.

When this product was milled with nitrolcellulose resin, a plasticized product having excellent oil resistance was obtained.

EXAMPLE V

Preparation of 1,3,5-Tris(Carbo-2-Ethylhexoxy)-Hexahydro-s-Triazine

A mixture of 400 parts of 2-ethylhexyl carbamate and 180 parts of 44% formaldehyde was acidified with 12 parts of 87% phosphoric acid and refluxed for two hours. The organic layer which separated was removed, acidified with 6 parts of phosphoric acil and dried by distillation at 20 mm. pressure. The dried product was a viscous, colorless balm. This material was heated at 140–150° C. for two hours. After 15 minutes the viscosity had decreased to 10.5 poises at 25° C. After one hour the viscosity was five poises at 25° C. After two hours the product was cooled, carbon treated and filtered, to yield 410 parts of a practically colorless oil having a viscosity of 4.7 poises at 25° C. After washing and drying this material as in the previous examples there was obtained a colorless oil having a viscosity of 4.2 poises at 25° C. and $n_D^{25}$ 1.4675. The infrared spectrum of this material showed it to consist almost entirely of 1,3,5-tris(carbo-2-ethylhexoxy)-hexahydro-s-triazine.

*Analysis.*—Calc'd. for $C_{30}H_{57}N_3O_6$: N, 7.56. Found: N, 7.29.

When this product was milled with nitrocellulose resin, a plasticized product having excellent oil resistance was obtained.

EXAMPLE VI

Preparation of 1,3,5-Tris(Carbobutoxy)-Hexahydro-s-Triazine

The effect of various acid catalysts was shown as follows: A mixture of 585 parts of n-butyl carbamate and 445 parts of 37% formaldehyde was acidified with 35 parts of 87% phosphoric acid and refluxed for 3.5 hours. The oil layer was removed and washed with hot water, dilute caustic, dilute sodium sulfite and finally several times with hot water. The washed, neutral product was dried by distillation, at a pressure of 20 mm. The residue partly solidified on cooling to form a thick, oily paste, having a viscosity of about 60 poises. A number of identical samples of this product were placed in test tubes immersed in an oil bath at 140–150° C. To each tube was added 0.25–0.5 gram of a variety of organic and inorganic acids and acid-reacting catalysts. An additional sample containing no catalyst was placed into the bath. After 2.5 hours the test tubes were removed from the bath and cooled to room temperature. All of the catalyzed samples had become completely liquid. Viscosities of these samples, measured at 25° C., were as follows:

| Catalyst: | Viscosity, poises |
|---|---|
| Sulfuric acid | 3.4 |
| Diglycolic acid | 17.0 |
| Chloroacetic acid | 3.5 |
| Phosphoric acid | 3.5 |
| Zinc chloride | 7.5 |
| Aluminum chloride | 4.0 |
| Control | 60 |

The uncatalyzed sample was an oily paste which was indistinguishable from the unheated product.

It is apparent that this invention is susceptible to numerous modifications within the scope of the disclosure, and it is intended to include such variations within the scope of the following claims.

I claim:

1. As a new composition of matter, a hexahydrotriazine of the formula:

$$\text{ROCON}\begin{array}{c}\text{CH}_2\\ \diagup\quad\diagdown\\ \text{N}\quad\text{NCOOR}\\ |\quad\quad|\\ \text{CH}_2\quad\text{CH}_2\\ \diagdown\quad\diagup\\ \text{N}\\ |\\ \text{COOR}\end{array}$$

wherein R is an alkyl radical of at least four to about twelve carbon atoms.

2. 1,3,5-tris(carbobutoxy)-hexahydro-s-triazine.
3. 1,3,5-tris(carboisopentoxy)-hexahydro-s-triazine.
4. 1,3,5-tris(carbopentoxy)-hexahydro-s-triazine.
5. 1,3,5-tris(carbooctoxy)-hexahydro-s-triazine.
6. 1,3,5-tris(carbo-2-ethylhexoxy)-hexahydro-s-triazine.
7. The method of producing an alkyl ester of 1.3.5-tris-(carboxy)-hexahydro-s-triazine wherein the alkyl group contains at least three to about twelve carbon atoms, which comprises the step of reacting an alkyl ester of carbamic acid wherein the alkyl group contains at least three to about twelve carbon atoms with formaldehyde in the presence of an acid catalyst at a temperature below 100° C. to produce a high molecular weight linear polymeric product, followed by the step of heating said polymeric product in the substantial absence of water at a temperature over 100° C. in the presence of at least 1% of an acid catalyst, thereby converting the polymeric product into said ester of 1,3,5-tris(carboxy)-hexahydro-s-triazine.

References Cited in the file of this patent

UNITED STATES PATENTS

| 2,171,965 | Weihe | Sept. 5, 1939 |

FOREIGN PATENTS

| 903,973 | France | Feb. 12, 1945 |
| 461,352 | Great Britain | Feb. 11, 1937 |

OTHER REFERENCES

Giua et al.: Chemisches zentralblatt, 1930 (I), pages 40 to 41.

Marvel et al.: Journ. of the Am. Chem. Soc., vol. 68, pp. 1683 and 1685 (1946).

Hendry et al.: British Journal of Pharmacology and Chemotherapy, vol. 6, page 214 (1951).

Beilsteins Handbuch der Organischen Chemie, 4th edition, vol. 26, p. 5 (Zweites Ergänzungswerk), 1954.

UNITED STATES PATENT OFFICE
CERTIFICATE OF CORRECTION

Patent No. 3,065,232                        November 20, 1962

Donald K. George

It is hereby certified that error appears in the above numbered patent requiring correction and that the said Letters Patent should read as corrected below.

Column 4, line 65, for "10" read -- 100 --; column 5, line 25, for "nitrolcellulose" read -- nitrocellulose --; line 36, for "acil" read -- acid --.

Signed and sealed this 2nd day of July 1963.

(SEAL)
Attest:

ERNEST W. SWIDER
Attesting Officer

DAVID L. LADD
Commissioner of Patents